Aug. 14, 1962 R. L. ZINKE 3,049,676

RANDOM PULSE GENERATOR

Filed Nov. 7, 1960 2 Sheets-Sheet 1

INVENTOR.
ROBERT L. ZINKE
BY
ATTORNEY

Aug. 14, 1962 R. L. ZINKE 3,049,676

RANDOM PULSE GENERATOR

Filed Nov. 7, 1960 2 Sheets-Sheet 2

INVENTOR.
ROBERT L. ZINKE
BY
[signature]
ATTORNEY 3,049,676

RANDOM PULSE GENERATOR

Robert L. Zinke, East Northport, N.Y., assignor to Sperry Rand Corporation, Great Neck, N.Y., a corporation of Delaware Filed Nov. 7, 1960, Ser. No. 67,555
6 Claims. (Cl. 331—78)

The present invention relates to generators for producing a succession of randomly spaced pulses and, more particularly, to a generator of such type producing a succession of pulses wherein each successive pulse randomly occurs between predetermined minimum and maximum time delays following the occurrence of its immediately preceding pulse.

Prior art techniques for the generation of a succession of randomly spaced pulses commonly employ noise generators as the source of the required random function. Noise generators, however, are not optimally suitable in applications where the desired "randomness" is to be confined within predetermined fixed limits. In terms of the time separation between the successive pulses to be generated, for example, it becomes desirable in certain applications that each successive pulse follow its immediately preceding pulse by an unpredictable amount which in no case is less than nor greater than pre-established limiting amounts. Conventional noise sources do not readily satisfy such conditions because of the occasional presence of frequency components which lie outside any pre-established minimum and maximum frequency values.

It is the principal object of the present invention to provide a random pulse generator for producing a succession of randomly spaced successive pulses wherein the minimum and maximum pulse spacing between the successive pulses is pre-established.

Another object is to provide a generator for producing a series of randomly spaced successive pulses having pre-established minimum and maximum spacings between the successive pulses which are controllably variable.

A further object is to provide means for delaying each of a succession of input pulses by an amount which will randomly fall within predetermined minimum and maximum values.

An additional object is to provide means for delaying each of a series of input pulses by a specifically unpredictable amount lying between controllable minimum and maximum values.

These and other objects of the present invention, as will appear from a reading of the following specification, are achieved in a preferred embodiment by the provision of a plurality of cascaded multivibrator circuits each of which is controllably operative in a bistable or in an astable mode. The cascaded multivibrators coact as a conventional pulse counter when the constituent multivibrators operate in the bistable mode. Each of the multivibrators oscillates at an independent frequency when operated in the astable mode. A control signal of substantially fixed duration is applied to the cascaded multivibrators to cause operation in the astable mode. Said multivibrators operate as a pulse counter in the absence of said control signal to count the number of input pulses applied thereto from a pulse generator having a preselected frequency.

In the preferred embodiment, the control signal is generated by a conventional monostable multivibrator producing an output waveform having a leading edge concurrent with an applied trigger and a trailing edge following said trigger by an amount that is subject to inherent minute variation. Thus, each of the cascaded multivibrators is caused to "free run" for an interval subject to random minute variation whereby the states of conduction of the multivibrators are randomly interrelated at the end of each interval. The multivibrator states of conduction, in turn, determine the value of the initial count stored in the pulse counter which is automatically formed upon the termination of the control signal. The cascaded multivibrators then proceed to count the number of input pulses applied thereto following the termination of the control signal.

In conventional fashion, an output pulse is produced by the pulse counter when the count therein progresses through a zero value. The time at which said output pulse is produced depends upon the value of the initial count stored in the counter at the termination of the control signal with value, as previously explained, is essentially random. In this manner, an output pulse is produced from the counter at a random time following the occurrence of the trigger pulse applied to the monostable multivibrator. In no case, however, will said output pulse from the counter occur earlier than the termination of the control signal or later than said termination by the time required for the value of the counter to proceed from zero to its maximum value in response to the input pulses applied thereto. The operational sequences may be repeated indefinitely to produce a succession of randomly spaced output pulses by utilizing each output pulse as said trigger pulse to trigger the monostable multivibrator.

For a more complete understanding of the present invention reference should be had to the following specification and to the appended drawings of which:

Figure 1:
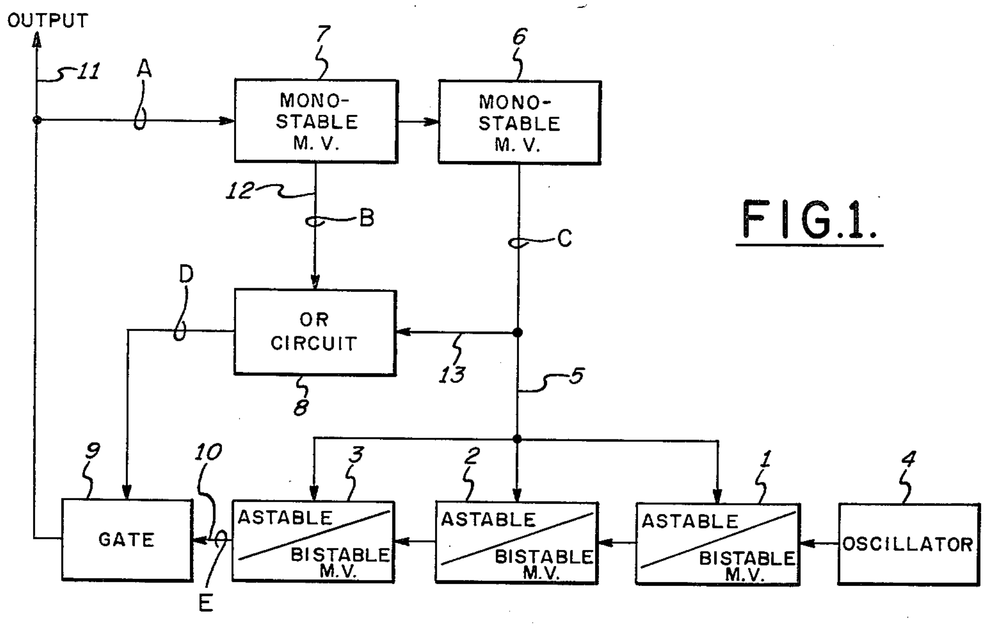
FIG. 1 is a simplified block diagram of a preferred embodiment.

In FIG. 1, a representative plurality of multivibrators 1, 2 and 3 are connected in cascade with the output of a preceding one being coupled to the input of the next succeeding one. As will be more fully explained later, each of multivibrators 1, 2 and 3 are adapted to operate either as a bistable multivibrator or as an independently operative astable multivibrator or oscillator. When operative in the bistable mode, cascaded multivibrators 1, 2 and 3 coact as a conventional pulse counter circuit. Oscillator 4 produces a regularly repetitive series of pulses for application to the pulse counter comprised of multivibrators 1, 2 and 3. The repetition rate of the pulses produced by oscillator 4 is very low in relation to the free-running frequency of multivibrators 1, 2 and 3 when operative in the astable mode. In a typical case, the repetition rate of oscillator 4 is two cycles per second whereas the free-running frequency of each of multivibrators 1, 2 and 3 is approximately 100 kilocycles per second.

A bivalued control signal applied by lead 5 jointly to multivibrators 1, 2 and 3 determines the mode of operation thereof. The control signal, in turn, is generated by monostable multivibrator 6 which produces an output rectangular wave in response to an actuating signal derived from the output of monostable multivibrator 7. Multivibrator 6 produces an output rectangular wave having a leading edge concurrent with the actuating signal and a trailing edge occurring at a substantially fixed time following the occurrence of the actuating signal. Monostable multivibrator 7 produces an output rectangular wave having leading and trailing edges similarly related to the occurrence of each trigger pulse on lead 11. Multivibrator 6 is actuated concurrently with the trailing edge of the output rectangular wave generated by multivibrator 7. By way of example, the duration of the rectangular waves produced by multivibrators 7 and 6 may be 100 milliseconds and 200 milliseconds, respectively with the leading edge of the rectangular wave of multivibrator 6 occurring simultaneously with the trailing edge of the rectangular wave of multivibrator 7.

The two rectangular waves are applied jointly to OR circuit 8 to produce a resultant output rectangular wave having a leading edge concurrent with the leading edge of the rectangular wave of multivibrator 7 and having a trailing edge concurrent with the trailing edge of the rectangular wave of multivibrator 6. Said resultant output rectangular wave is applied to the "inhibit" input of gate circuit 9. That is, gate 9 is closed, i.e., rendered nonconductive, upon the application of the resultant output rectangular wave of OR circuit 8. In this manner, gate 9 is closed in advance of and for the duration of the time that the control signal output of multivibrator 6 is applied to the multivibrators 1, 2 and 3. Gate 9 is otherwise open or conductive to the flow of pulses appearing on lead 10 at the output of multivibrator 3. Pulses passed by conducting gate 9 are applied to the output lead 11, and trigger multivibrator 7.

Figure 2:
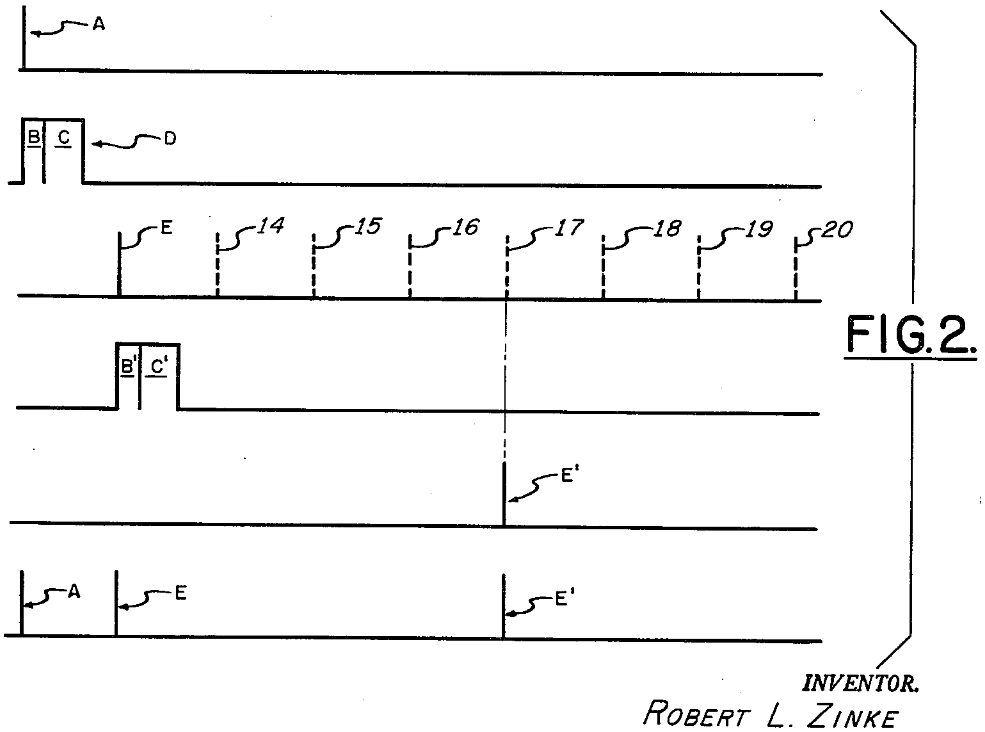
FIG. 2 is a series of idealized waveforms useful in explaining the operation of the apparatus represented in FIG. 1.

To exemplify the operation of the apparatus represented in FIG. 1, assume that pulse A of FIG. 2 is produced on lead 11. Said pulse triggers multivibrator 7 to generate the rectangular wave B of FIG. 2 which is applied by lead 12 to OR circuit 8. As previously mentioned, multivibrator 6 is triggered concurrently with the trailing edge of rectangular wave B to produce rectangular wave C of FIG. 2 which is applied via lead 13 to the second input of OR circuit 8. In accordance with the previously given typical values, the durations of waves B and C are 100 milliseconds and 200 milliseconds, respectively.

Wave C is also applied by lead 5 jointly to multivibrators 1, 2 and 3 causing each of said multivibrators to "free run" independently of each other at a frequency of approximately 100 kilocycles per second. In practice, each of multivibrators 1, 2 and 3 utilize components having identical nominal values. Inasmuch as the circuit components are not of identical actual value due to manufacturing tolerances, each of multivibrators 1, 2 and 3 will operate at substantially but not identically the same frequency.

The time interval during which multivibrators 1, 2 and 3 "free run" is determined by the duration of wave C produced by multivibrator 6. The duration of wave C, in turn, is not identically the same, i.e., it is subject to minute random variations as described earlier, following each actuating pulse derived from the output of multivibrator 7. For example, a monostable multivibrator which is intentionally designed to provide a timing period of say 0.2 second may actually produce an output rectangular wave having a duration of 0.2 second $\pm 0.01\%$. In other words, one output rectangular wave may have a duration of 0.200020 second whereas the rectangular wave produced in response to the next succeeding input trigger pulse may have a duration of 0.199987 second. The rectangular waves will have durations with some random distribution within $\pm 20$ microseconds about a value of 0.2 second.

It will be seen that inasmuch as multivibrators 1, 2 and 3 are concurrently triggered into an astable mode for a period of time which is randomly determined, the states of conduction of multivibrators 1, 2 and 3 will be randomly interrelated at the instant when the free-running mode is terminated and the bistable or counting mode is begun. The interrelationship between said states of conduction may be considered to represent a count which is initially inserted into the pulse counter comprised of multivibrators 1, 2 and 3. Of course, the length of time required for the stored count to proceed from its initial value to its maximum value is dependent upon the initial value as well as the fixed repetition interval of the pulses produced by oscillator 4. Referring again to FIG. 2, it is assumed that an initial count of 7 is stored in the three stage counter comprised of multivibrators 1, 2 and 3 upon the termination of wave C. Consequently, an output pulse E is produced on line 10 concurrently with the next succeeding input pulse derived from oscillator 4. It should be noted that output pulse E also could have occurred at any one of the seven dotted time positions 14–20 depending upon the value of the initial count. For example, if the states of conduction of the multivibrators represented a zero count upon the termination of wave C, output pulse E would have appeared at time position 20.

Pulse E, occurring subsequent to the termination of resultant wave D at the output of OR circuit 8, passes through gate 9 and triggers multivibrator 7 to start another cycle of operation. As before, multivibrators 7 and 6 produce another pair of rectangular waves designated B′ and C′, respectively. For the duration of wave C′, multivibrators 1, 2 and 3 will again free run independently of each other. It is assumed that the states of conduction of multivibrators 1, 2 and 3 upon the termination of wave C′ represents a count of four whereupon pulse E′ is produced on line 10 concurrently with the fourth input pulse at the output of oscillator 4 following said termination. Thus, the three pulse sequence A, E, E′ is produced on line 10. Additional successive pulses will be produced in similar fashion.

Each additional pulse (corresponding to pulse E) follows its immediately preceding pulse (corresponding to pulse A) by an unpredictable or random amount which in no case is less than a first amount (a single repetition interval of oscillator 41) nor greater than N such repetition intervals where *n* represents the maximum numerical capacity (eight in the illustrative case where three multivibrator circuits are used) of the pulse counter. Both limiting values can be changed merely by shifting the operating frequency of oscillator 4 in any known manner. The minimum limiting value, i.e., the minimum time by which a succeeding pulse may follow its immediately preceding pulse on line 10, may be varied independently of the repetition interval of oscillator 4 by varying the duration of the rectangular waveform C produced by multivibrator 6 in a conventional fashion. It should be noted that pulse E follows pulse A in FIG. 2 by one repetition interval of oscillator 4 because the duration of resultant wave D is less than said repetition interval. If the duration of wave D were 1½ times said repetition interval, for example, then the first pulse following pulse A would occur at time position 14.

Figure 3:
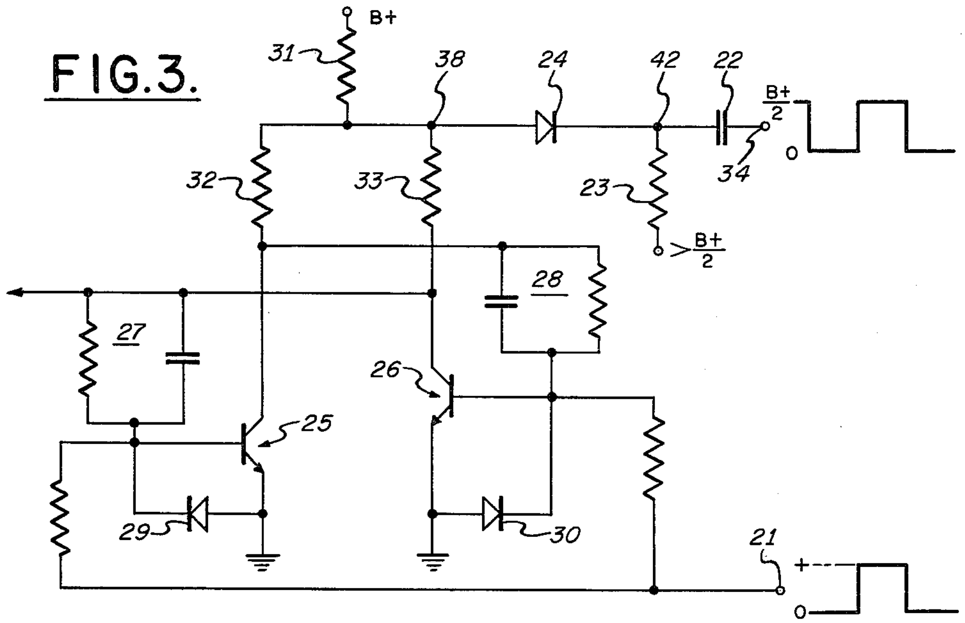
FIG. 3 is a schematic drawing of a dual mode multivibrator circuit suitable for application in the preferred embodiment.

FIG. 3 illustrates a particularly simple multivibrator circuit suitable for instrumenting each of multivibrators 1, 2 and 3 of FIG. 1. Other arrangements will occur to those skilled in the art. The circuit of FIG. 3 will operate in a bistable or astable mode in accordance with the value of the control signal applied to terminal 21. A feature of the circuit of FIG. 3 attributable to the coupling network of capacitor 22, resistor 23 and diode 24 (for interconnecting a preceding one to a succeeding one of the cascaded multivibrators 1, 2 and 3) is that a succeeding one of the cascaded multivibrators will be triggered by the output pulses of its immediately preceding multivibrator only when said preceding multivibrator is operating in its relatively low frequency bistable mode and not when it is operating in its relatively high frequency astable mode.

The multivibrator of FIG. 3 comprises NPN transistors 25 and 26 having grounded emitters. The collector of transistor 26 is coupled via R-C network 27 to the base of transistor 25. Similarly, the collector of transistor 25 is coupled via R-C network 28 to the base of transistor 26. Diodes 29 and 30 respectively clamp the minimum potential at the bases of transistors 25 and 26 to ground potential. A positive potential is applied to the collectors of transistors 25 and 26 by resistor 31 and respective ones of resistors 32 and 33. The circuit so far described will be recognized as being a conventional collector-triggered transistorized bistable multivibrator so long as the nominal base potentials of transistors 25 and 26 are maintained at ground potential. On the other hand, if the nominal base potential should assume a positive value above ground potential, the regenerative action of the multivibrator would become self-sustaining resulting in an astable or free-running mode of operation.

As is well known, a grounded emitter NPN transistor may be held cut off when the base thereof is maintained at ground potential whereas said transistor will conduct when the base is driven positively above ground potential. Thus, a nonconducting one of transistors 25 and 26 will remain nonconducting for an indefinite time when a ground potential is applied to terminal 21 whereas neither of transistors 25 and 26 can remain nonconductive for an indefinite time when a positive potential is applied to terminal 21. Consequently, the multivibrator of FIG. 3 operates in a bistable mode when ground potential is applied to terminal 21 and operates in an astable mode when a positive potential is applied to terminal 21. The states of conduction of transistors 25 and 26 when operating in the bistable mode are reversed in a conventional fashion upon the application of negative-going rectangular waves to terminal 34.

It can be shown, however, that the multivibrator circuit comprised of transistors 25 and 26 is responsive only to rectangular waves of relatively low frequency as generated by oscillator 4 and nonresponsive to rectangular waves of relatively high frequency such as generated by any of multivibrators 1, 2 and 3 when operative in the astable mode. The rectangular wave applied to terminal 34 is derived from the collector electrode corresponding to the collector of transistor 26 of a preceding multivibrator. It should be noted that the potential extremities of the rectangular wave produced at collector 26 are constant irrespective of the frequency of operation of the multivibrator comprised of transistors 25 and 26. Said potential extremities are designated B+/2 and 0, respectively, in the waveforms of FIG. 4.

Figure 4:
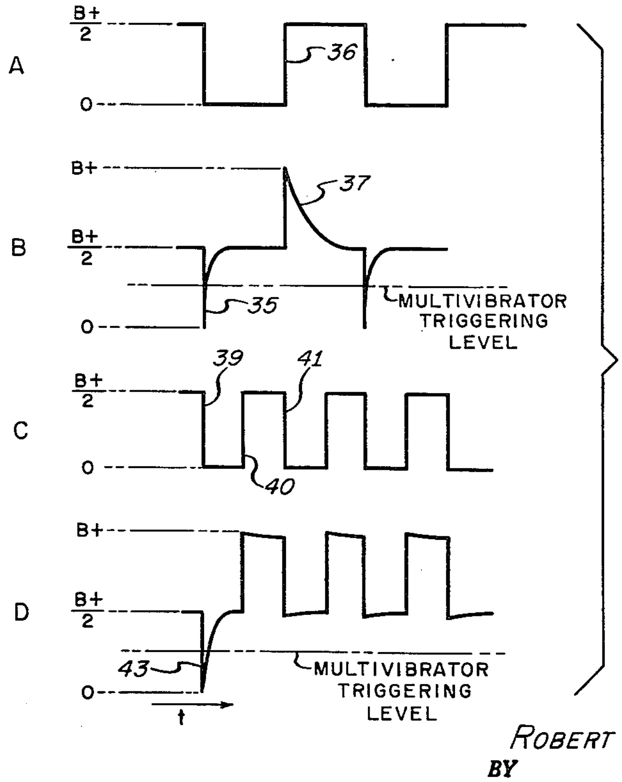
FIG. 4 is a series of waveforms useful in explaining the operation of the multivibrator circuit of FIG. 3.

Assume that waveform A of FIG. 4 is produced by multivibrator 1 at the collector of the transistor corresponding to transistor 26 and that said waveform is applied to the input terminal of multivibrator 2 corresponding to terminal 34. Assume further that multivibrator 1 is operating in its bistable mode wherein the frequency of waveform A of FIG. 4 is of a relatively low value determined by the repetition rate of oscillator 4. Referring to FIG. 3, the nominal potential of junction 38 is B+/2 irrespective of which transistor is conducting. It will be seen that as the potential of waveform A drops from its initial value of B+/2 toward zero, diode 24 is rendered conductive allowing capacitor 22 to charge rapidly through the paralleled combination of resistors 23, 31 and 32 in parallel with the series combination of resistors 33 and 27. This is the condition when the states of conduction of transistors 25 and 26 is such that transistor 25 is "on" and transistor 26 is "off." The negative-going pulse 35 of waveform B is produced in typical differentiator fashion at junction 42 and is coupled to junction 38 through conducting diode 24. Upon the occurrence of the positive-going edge 36 of waveform A, the signal is blocked by diode 24 causing capacitor 22 to fully discharge at a much slower rate than before through the relatively higher impedance of resistor 23 alone. This results in the production of positive-going pulse 37 of waveform B of FIG. 4 at junction 42. Nonconducting diode 24 blocks pulse 37 from appearing at junction 38.

As is well understood, where collector triggering of the transistorized multivibrator is employed, it is first necessary that the collector potential of both transistors comprising the multivibrator be lowered briefly to a value cutting off both transistors in order to initiate a reversal in the states of conduction of the transistors. Negative-going pulse 35 of waveform B is of sufficient amplitude to initiate such a reversal in the states of conduction of transistors 25 and 26.

On the other hand, if the rectangular wave C of FIG. 4 is applied to terminal 34, a reversal in the states of conduction of transistors 25 and 26 will not be effected. The potential extremities of waveform C are identical to those of waveform A. The frequency of waveform C, however, is the relatively high frequency at which transistors 1, 2 and 3 operate when in the astable mode. For the sake of clarity the time coordinates of waveforms A and C are not drawn to scale. In the illustrative case, the frequency of waveform C actually is about fifty thousand times that of waveform A. As before, capacitor 22 passes the initial negative-going edge 39 of waveform C and charges through conducting diode 24 to produce negative going pulse 43 of waveform D at junctions 38 and 42. Upon the occurrence of positive-going edge 40, diode 24 once again is blocked but now capacitor 22 cannot discharge to any appreciable degree through solely resistor 23 before the occurrence of the next succeeding negative-going edge 41 of waveform C because of the relatively short time interval between edges 40 and 41. Consequently, capacitor 22 remains charged maintaining junction 42 at a potential of B+ and blocking diode 24. During the occurrence of negative-going edge 41, diode 24 conducts only by the very small amount necessary to replace the charge lost by capacitor 22 through resistor 23 during the interval between edges 40 and 41 of waveform C. For practical purposes, however, it can be said that diode 24 substantially eliminates any further variation in potential at junction 38. The waveform D at junction 42 thereafter merely follows the excursions of waveform C but between the values of B+ and B+/2 as opposed to the values of B+/2 and 0 between which waveform C varies. No repetitive reversals are effected in the states of conduction of transistors 25 and 26.

Thus, multivibrators 1, 2 and 3 coact as a conventional pulse counter wherein a succeeding multivibrator is triggered by the output pulse of its preceding multivibrator only in response to the relatively low frequency trigger pulse produced by oscillator 4. When multivibrators 1, 2 and 3 are operated in their astable mode in response to the control signal produced by multivibrator 6 and applied to terminal 21 a succeeding multivibrator is not triggered by its preceding multivibrator. Each of the multivibrators 1, 2 and 3 instead oscillates at a relatively high free-running frequency completely independently of the oscillation of its neighboring multivibrator. Inasmuch as each of multivibrators 1, 2 and 3 operate at a high but nonidentical frequency, it can be seen that the relative states of conduction of the multivibrators will be determined by the length of time that the multivibrators are permitted to free run. As previously mentioned, said length of time itself is a function of the duration of the output pedestal produced by multivibrator 6 which is subject to a small but substantially random variation. Consequently, the relative states of conduction of multivibrators 1, 2 and 3 are randomly interrelated in response to successive ones of the output pulses produced by multivibrator 6 whereupon output pulse E of FIG. 2 occurs at a random time between fixed limits following its initiating pulse A.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus comprising a plurality of multivibrator circuits selectably connected in cascade, each of said multivibrator circuits being operative at a respective free-running frequency in an independent astable mode in response to a first value of a bivalued control signal and being operative in a triggerable bistable mode in response to the other value of said control signal, a first source of regularly repetitive triggering pulses connected to the input of the first one of said plurality of multivibrator circuits, a second source for producing said control signal in response to a triggering signal, said control signal having said first value for an approximately fixed but minutely randomly variable length of time following the occurrence of said triggering signal and having said other value thereafter, said control signal being applied jointly to each of said multivibrator circuits, and individual means for selectably connecting the output of a preceding one of said multivibrator circuits to the input of a succeeding one of said multivibrator circuits susbtantially only during the time that each of said multivibrator circuits is operative in said bistable mode.

2. Apparatus as defined in claim 1 and further including means for coupling the output of the last of said plurality of multivibrator circuits to the input of said second source.

3. Apparatus as defined in claim 2 wherein said means for coupling comprises a gating circuit, said gating circuit being rendered nonconductive by said first value of said control signal, and means for applying said control signal to said gating circuit.

4. Apparatus comprising a plurality of multivibrator circuits selectably connected in cascade, each of said multivibrator circuits being operative at a respective free-running frequency in an independent astable mode in response to a first value of a bivalued control signal and being operative in a triggerable bistable mode in response to the other value of said control signal, a first source of regularly repetitive triggering pulses conneced to the input of the first one of said plurality of multivibrator circuits, a second source for producing said control signal in response to a triggering signal, said control signal having said first value for an approximately fixed but minutely randomly variable length of time following the occurrence of said triggering signal and having said other value thereafter, said control signal being applied jointly to each of said multivibrator circuits, means for selectably connecting the output of a preceding one of said multivibrator circuits to the input of a succeeding one of said multivibrator circuits substantially only during the time that each of said multivibrator circuits is operative in said bistable mode, a third source for producing an inhibiting signal having a leading edge preceding the initiation of said control signal and having a trailing edge substantially concurrent wth the termination of said control signal, a nominally conductive gating circuit connected to the ouput of the last one of said plurality of multivibrator circuits, and means for applying said inhibiting signal to said gating circuit to render said gating circuit nonconductive during the occurrence of said inhibiting signal.

5. Apparatus comprising a plurality of multivibrator circuits selectably connected in cascade, each of said multivibrator circuits being operative at a respective free-running frequency in an independent astable mode in response to a first value of a bivalued control signal and being operative in a triggerable bistable mode in response to the other value of said control signal, a source of regularly repetitive triggering pulses connected to the input of the first one of said plurality of multivibrator circuits, a first monostable multivibrator for producing said control signal in response to a first triggering signal, said control signal having said first value for an approximately fixed but minutely randomly variable length of time following the occurrence of said first triggering signal and having the other value thereafter, said control signal being applied jointly to each of said multivibrator circuits, means for selectably connecting the output of a preceding one of said multivibrator circuits to the input of a succeeding one of said multivibrator circuits substantially only during the time that each of sad multivibrator circuits is operative in said bistable mode, a second monostable multivibrator for producing said first triggering signal in response to a second triggering signal, means for combining said control signal and said first triggering signal to produce an inhibiting signal having a leading edge preceding the initiation of said control signal and having a trailing edge substantially concurrent with the termination of said control signal, a nominally conductive gating circuit for connecting the output of the last one of said plurality of multivibrator circuits to the input of said second monostable multivibrator, and means for applying said inhibiting signal to said gating circuit to render said gating circuit nonconductive during the occurrence of said inhibiting signal.

6. Apparatus comprising a plurality of collector triggered transistorized multivibrator circuits, each said multivibrator circuit being operative at a respective free-running frequency in an independent astable mode in response to a first value of a bivalued control signal and being operative in a triggerable bistable mode in response to the other value of said control signal, individual means for selectably connecting the output of a preceding one of said multivibrator circuits to the input of a respectively succeeding one of said multivibrator circuits, each said means for selectably connecting comprising a diode, a capacitor and a resistor, one terminal of each being connected to a common junction, the other terminal of said capacitor being connected to said output of a preceding multivibrator circuit and the other terminal of said diode being connected to the input of a succeeding multivibrator circuit, the other terminal of said resistor being biased to a potential substantially equal to the potential at said input of said succeeding multivibrator, the time constant of said capacitor and said resistor being relatively long as compared to the repetition interval of each said multivibrator circuit when operative in the astable mode.

No references cited.